United States Patent [19]
Haase

[11] 3,834,369
[45] Sept. 10, 1974

[54] SAW BLADE HOOD LEVELING STRUCTURE
[75] Inventor: Victor H. Haase, Kansas City, Mo.
[73] Assignee: Robert G. Evans, Company, Kansas City, Mo.
[22] Filed: Jan. 22, 1973
[21] Appl. No.: 325,663

[52] U.S. Cl................................ 125/13 SS, 51/268
[51] Int. Cl............................................. B28d 1/04
[58] Field of Search......................... 125/13; 51/268

[56] References Cited
UNITED STATES PATENTS
| | | | |
|---|---|---|---|
| 1,294,565 | 2/1919 | Sumbling | 51/268 |
| 2,446,833 | 8/1948 | Johnson | 125/11 TP |
| 2,972,344 | 2/1961 | Bergen | 125/13 SS |
| 2,998,813 | 9/1961 | Wilson | 125/13 SS |

Primary Examiner—Harold D. Whitehead
Attorney, Agent, or Firm—Fishburn, Gold & Litman

[57] ABSTRACT

A rotary saw, such as a masonry saw includes a rocker platform supporting a rotating saw blade and blade driving elements, the platform being pivoted to the saw frame and spaced above a work piece table surface. A saw hood partially covers the blade and is pivotally mounted on the platform by an external curved band or segment engaging multiple grooved rollers. A pivotal link connects the hood to a standard mounted on the saw frame and maintains the lower edge of the hood in a horizontal attitude regardless of platform tilt angle.

5 Claims, 3 Drawing Figures

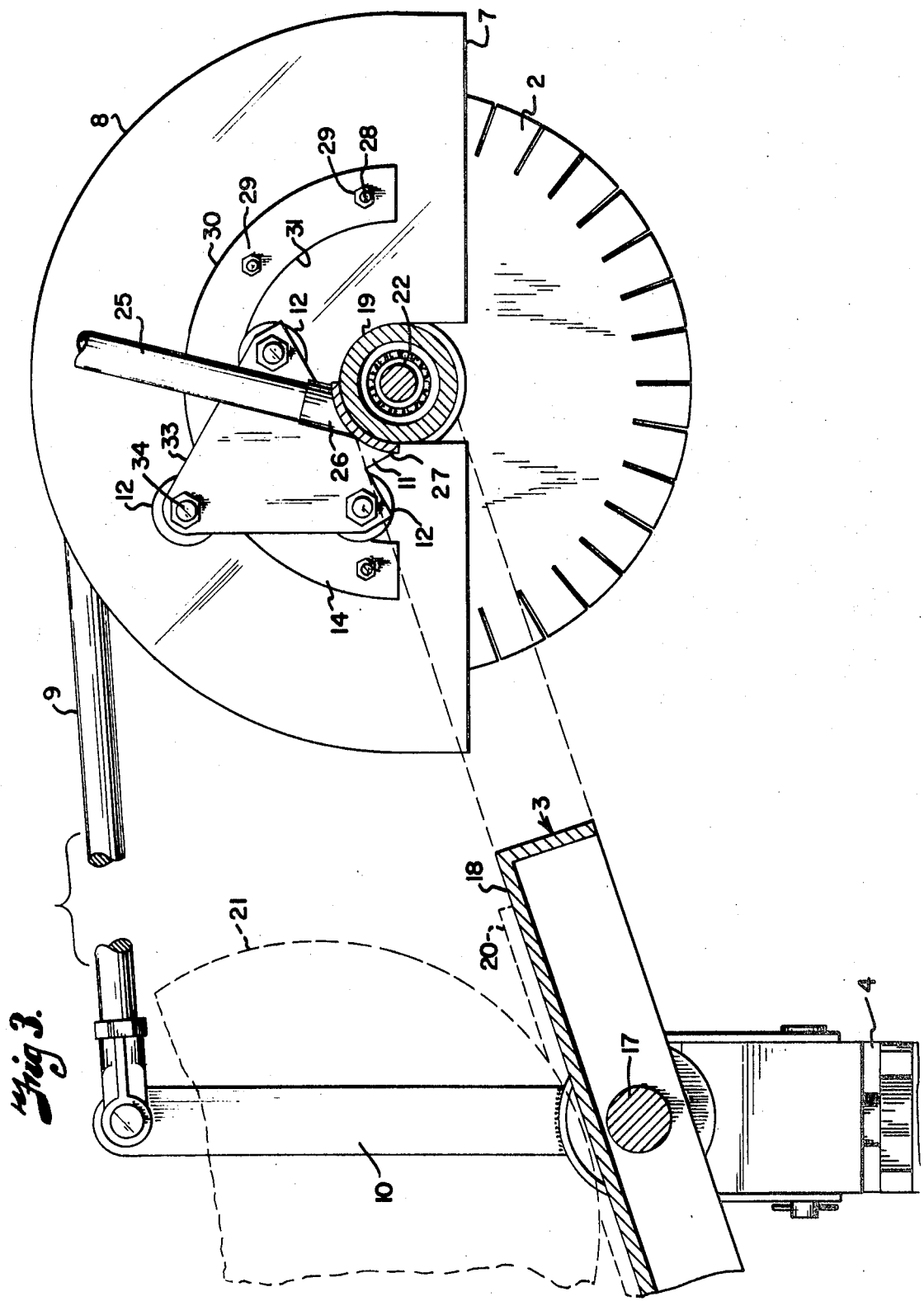

SAW BLADE HOOD LEVELING STRUCTURE

The present invention relates to rotary saws of the type utilized for cutting masonry, metal and the like and more particularly to a hood leveling structure for a rotary saw blade operative to maintain the lower edge of the hood substantially level during movement of the blade toward a work piece table surface.

The principal objects of the present invention are: to provide structure of simple construction for maintaining a lower edge of a blade hood level during movement of the blade toward and away from a work piece table surface; to provide such a hood leveling structure which includes an external curved band or segment mounted in engagement with a plurality of rollers, permitting rotary movement between the hood and the hood support member; to provide such a structure which avoids the difficulties inherent in hood pivoting arrangements closely associated with the saw shaft bearing housing; to provide such a hood leveling structure which has exposed moving parts and yet is reliable in an abrasive dust environment, and to provide such a hood leveling structure wherein the hood is easily removed and replaced, which is economical to manufacture, positive in operation, and particularly well adapted for its intended purpose.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features thereof.

FIG. 3 is a fragmentary, sectional view taken on the line 3—3, FIG. 2 showing further hood mounting details and with a portion of the saw structure shown in broken lines for clarity.

Figure 1:
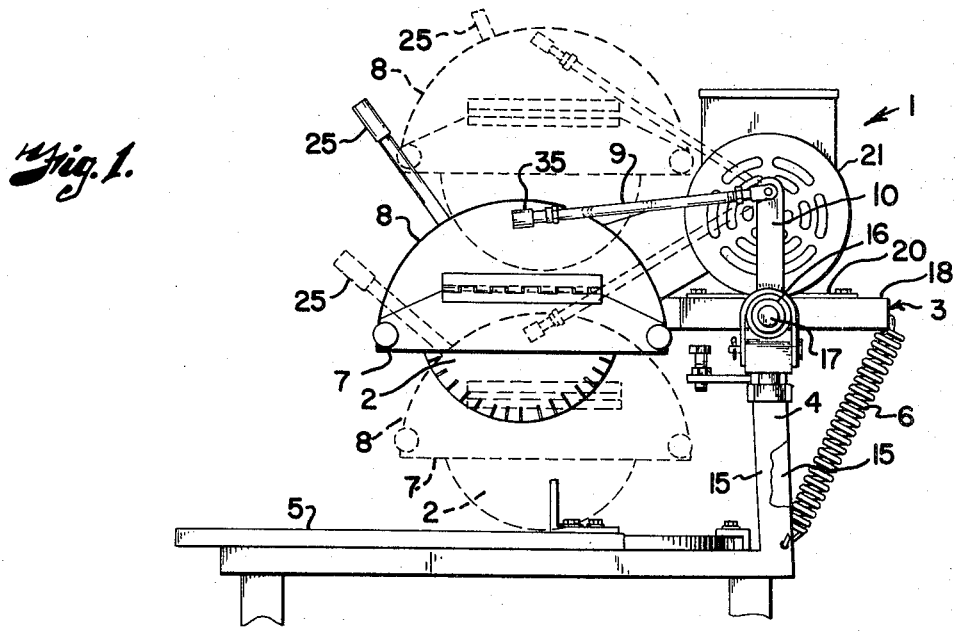
FIG. 1 is a fragmentary, side elevational view of a saw including a hood leveling structure embodying features of the present invention and showing alternate positions of the hood in broken lines.
Figure 2:
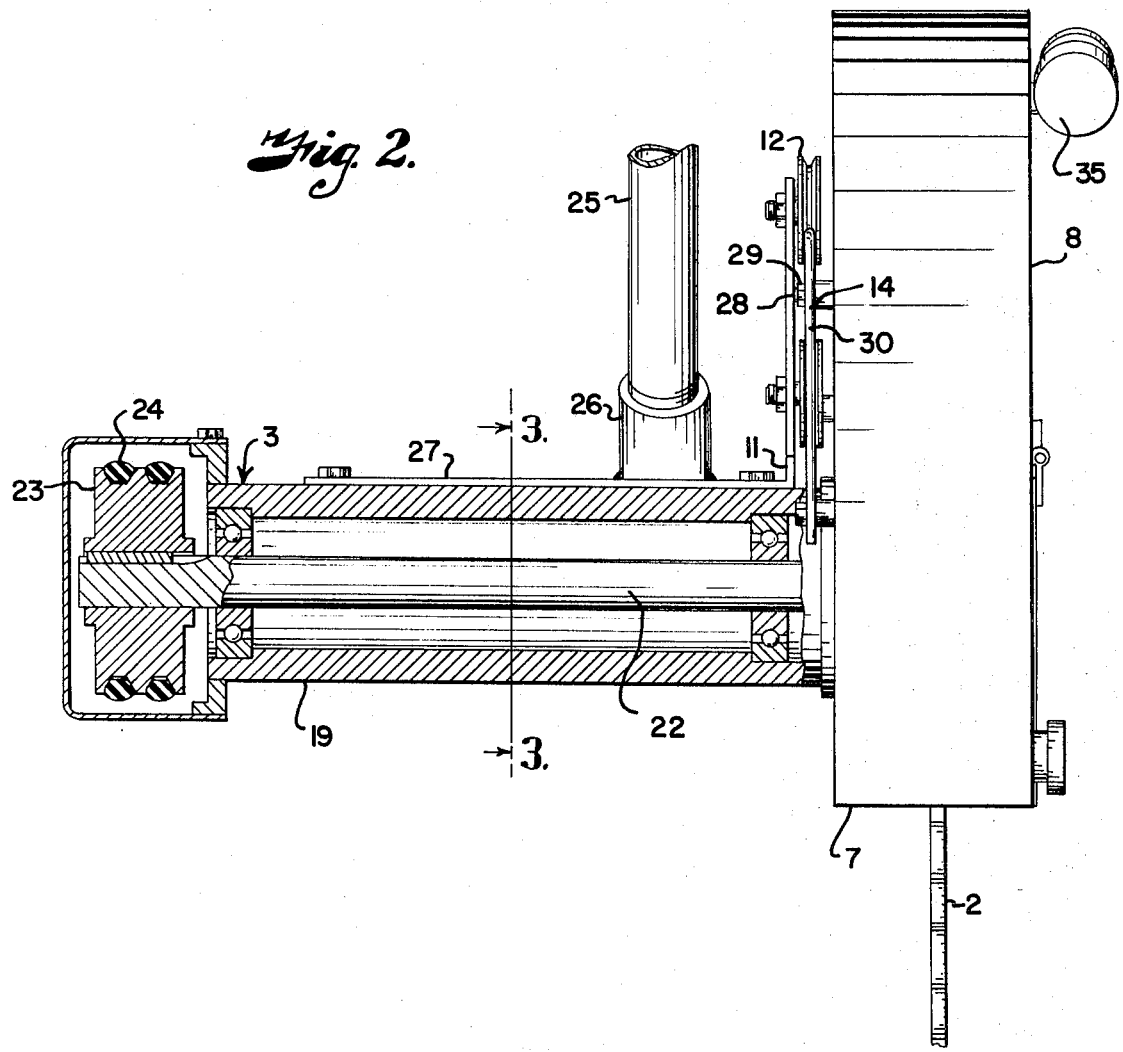
FIG. 2 is an enlarged, fragmentary front elevational view particularly showing the pivotal mounting arrangement of the hood.

Referring more in detail to the drawings:

In the disclosed embodiment, the reference numeral 1 generally designates a power saw assembly including a circular saw blade 2 rotatably mounted on a rocker platform 3. The platform 3 is pivoted to a frame 4 in a position spaced above a table top or work piece supporting surface 5. A spring 6 extends between and has respective opposite ends thereof connected to the rocker platform 3 and the frame 4 and normally urges the blade 2 away from the surface 5.

Travelling with the blade 2 is the lower edge 7 of a hood 8 which encloses the upper portion of the blade 2 to contain saw particles, cooling liquid, etc. A leveling arm 9 is pivotally connected to the hood 8 and to a standard 10 extending upwardly from the frame 4. An arm 11 is fixed to and extends from the platform 3 and supports, in this example, three grooved rollers 12 in a vertical plane and triangular, spaced relationship. As discussed further below, the rollers are engaged with a segment 14 mounted on and spaced slightly outwardly from the hood 8 whereby the leveling arm 9 and the rollers 12 cooperate to maintain the lower edge 7 of the hood 8 substantially level during rocking movement of the hood 8 toward and away from the surface 5.

The frame 4 includes a pair of laterally spaced upright members 15 extending upwardly from the rear thereof. Suitable bearings 16 are mounted in respective upper ends of the upright members 15 for pivotally supporting a shaft 17 associated with the rocker platform 3. The shaft 17 is located intermediate the rear 18 and forward portion 19 of the rocker platform 3, the rear 18 supporting the mount 20 of a drive motor 21. The forward portion 19 in this example, is tubular in configuration and receives therethrough a rotary bearing mounted shaft 22 which supports, at one end, the blade 2 and at the other end a pulley or sheave 23. The sheave 23 is driven in a conventional manner through belts 24 by the drive motor 21. A handle 25 is mounted by means of a suitable support 26 and connecting bracket 27 to the forward portion 19 for manually pivoting the rocker platform 3 relative to the surface 5. As noted above, the segment 14 is mounted on and spaced slightly outwardly from the hood 8, in this example by a plurality of circumferentially spaced bolts 28 and nuts 29. The segment 14 is located somewhat above the lower edge 7 of the hood 8 in a position substantially co-axial with the shaft 22 and is a generally planar member having a circular upper rail or edge 30 and a lower rail or edge 31. The arm 11 is fixedly mounted on the bracket 27 and has an upper triangular portion 33 supporting the grooved rollers 12 in rolling contact with the segment edges 30 and 31. The triangle formed by the rollers 12 has two legs thereof crossed by the segment 14 as best illustrated in FIG. 3. The rollers 12 are mounted on the roller support member 33, in this example, by studs 34 suitably secured to the roller support member 3 and extending outwardly therefrom and toward the hood 8.

By way of operation, pulling downwardly on the handle 25 pivots the rocker platform 3 about the shaft 17 against the resistance of the resilient members 6. The leveling arm 9 restricts the tendency of the hood 8 to rotate with the platform portion 19 and maintains the lower edge 7 of the hood 8 in a substantially level position, normally parallel to the surface 5. The rollers 12 arcuately support the hood 8 and permit the required relative pivoting between and the hood 8 portion 19. When the handle 25 is released, the resilient members 6 will cause the raising of the portion 19, but the described structure continues to maintain the hood lower edge 7 in level attitude.

Removal and replacement of the hood 8 for maintenance, etc., is facilitated by a quick-disconnect pivot anchor 35 located between the leveling arm 9 and the hood 8. Upon disconnecting the arm 9 from the hood 8, the latter may be freely rotated through an angle about the platform portion 19 until the segment 14 is no longer engaged with the rollers 12, whereupon the hood is free. Replacement is accomplished by a simple reversal of the above.

It is to be understood that while one form of this invention has been illustrated and described, it is not to be limited thereto except insofar as such limitations are included in the following claims.

What I claim and desire to secure by Letters Patent is:

1. A hood leveling structure for use with a rotary saw comprising:

a. a frame, a platform pivoted on said frame for rocking motion, said platform including a shaft housing containing shaft bearings, a driven shaft rotatably supported by said bearings, a saw blade mounted on said shaft, b. a hood partially covering said saw blade and having a lower edge spaced inwardly of the periphery of said saw blade, c. mounting means operably positioned between said hood and platform and including an arcuate rail member having spaced-apart ends and opposed semi-circular edges between said ends, said semi-circular edges being remote from said shaft housing, said mounting means further including a plurality of support means movably engaging said semi-circular edges between said support means and permitting guided pivoting between said hood and platform, and d. link means engaged between said hood and frame for maintaining said lower edge in a substantially level position during pivoting of said platform.

2. A hood leveling structure as set forth in claim 1 wherein:

a. said support means comprise multiple rollers and a bracket securing said multiple rollers to said platform.

3. A hood leveling structure as set forth in claim 1 wherein:

a. said semi-circular edges are generally coaxial with said shaft.

4. A hood leveling structure as set forth in claim 1 wherein:

a. said arcuate rail member is a segment secured to said hood with said semi-circular edges forming inner and outer rails, and b. said support means are multiple rollers secured to said platform and engaging said rails for supporting said hood while permitting relative pivoting movement between said hood and said housing.

5. A hood leveling structure as set forth in claim 1 wherein:

a. said link means for maintaining the lower edge of said hood in a substantially level position includes:

b. a standard extending from said frame and a leveling arm extending between and having opposite ends thereof pivotally connected to said standard and to said hood, c. said leveling arm being connected to said hood by a quick-disconnect anchor, d. said rail member ends being positioned for rotating beyond and out of engagement with said support means upon relative movement between said hood and platform, thereby freeing said hood.

* * * * *